(12) United States Patent
DesMarais et al.

(10) Patent No.: US 6,525,106 B1
(45) Date of Patent: Feb. 25, 2003

(54) METHOD FOR CONTINUOUS CURING OF HIPE INTO HIPE FOAMS

(75) Inventors: Thomas Allen DesMarais, Cincinnati, OH (US); Thomas Michael Shiveley, Moscow, OH (US); John Collins Dyer, Cincinnati, OH (US); Stephen Thomas Dick, Cincinnati, OH (US); Bryn Hird, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/890,918

(22) PCT Filed: Feb. 18, 2000

(86) PCT No.: PCT/US00/04353

§ 371 (c)(1),
(2), (4) Date: Aug. 7, 2001

(87) PCT Pub. No.: WO00/50498

PCT Pub. Date: Aug. 31, 2000

Related U.S. Application Data

(60) Provisional application No. 60/121,152, filed on Feb. 22, 1999.

(51) Int. Cl.⁷ .................................................. C08J 9/28
(52) U.S. Cl. ........................................... 521/64; 521/63
(58) Field of Search ...................... 521/64, 63

(56) References Cited

U.S. PATENT DOCUMENTS

| | | |
|---|---|---|
| 5,189,070 A | 2/1993 | Brownscombe et al. |
| 5,250,576 A | 10/1993 | DesMarais et al. |
| 5,252,619 A | 10/1993 | Brownscombe et al. |
| 5,260,345 A | 11/1993 | DesMarais et al. |
| 5,268,224 A | 12/1993 | DesMarais et al. |
| 5,290,820 A | 3/1994 | Brownscombe et al. |
| 5,331,015 A | 7/1994 | DesMarais et al. |
| 5,387,207 A | 2/1995 | Dyer et al. |
| 5,500,451 A | 3/1996 | Goldman et al. |
| 5,632,737 A | 5/1997 | Stone et al. |
| 5,633,291 A | 5/1997 | Dyer et al. |
| 5,670,101 A | 9/1997 | Nathoo et al. |
| 5,753,359 A | 5/1998 | Dyer et al. |
| 5,767,168 A | 6/1998 | Dyer et al. |
| 5,770,634 A | 6/1998 | Dyer et al. |
| 5,786,395 A | 7/1998 | Stone et al. |
| 5,795,921 A | 8/1998 | Dyer et al. |
| 5,849,805 A | 12/1998 | Dyer |

FOREIGN PATENT DOCUMENTS

WO    WO 97/37745 A1    10/1997

OTHER PUBLICATIONS

Bhumgara, Z., "Polyhipe Foam Materials as Filtration Media", *Filtration & Separation*, Mar. 1995, pp. 245–251.
Walsh, D.C.; Stenhouse, J.I.T.; Kingsbury, L.P.; Webster, E.J., "PolyHIPE Foams: Production, Characterisation, And Performance As Aerosol Filtration Matrials", *J. Aerosol Sci.*, vol. 27, Suppl. I, 1996, pp. 5629–5630.

*Primary Examiner*—Morton Foelak
(74) *Attorney, Agent, or Firm*—Angela Marie Stone; Edward J. Milbrada

(57) ABSTRACT

This application relates to flexible, microporous, open-celled polymeric foam materials with physical characteristics that make them suitable for a variety of uses. This application particularly relates to methods particularly suitable for continuously curing high internal phase emulsions to form such foams.

7 Claims, 5 Drawing Sheets

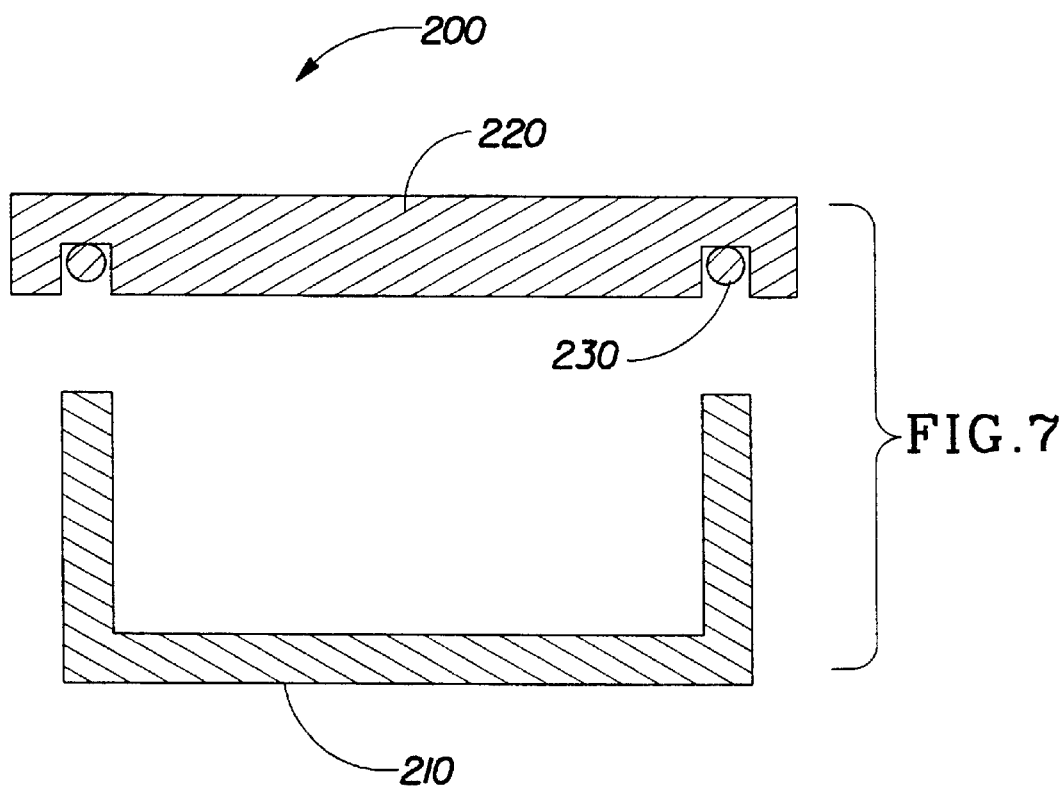
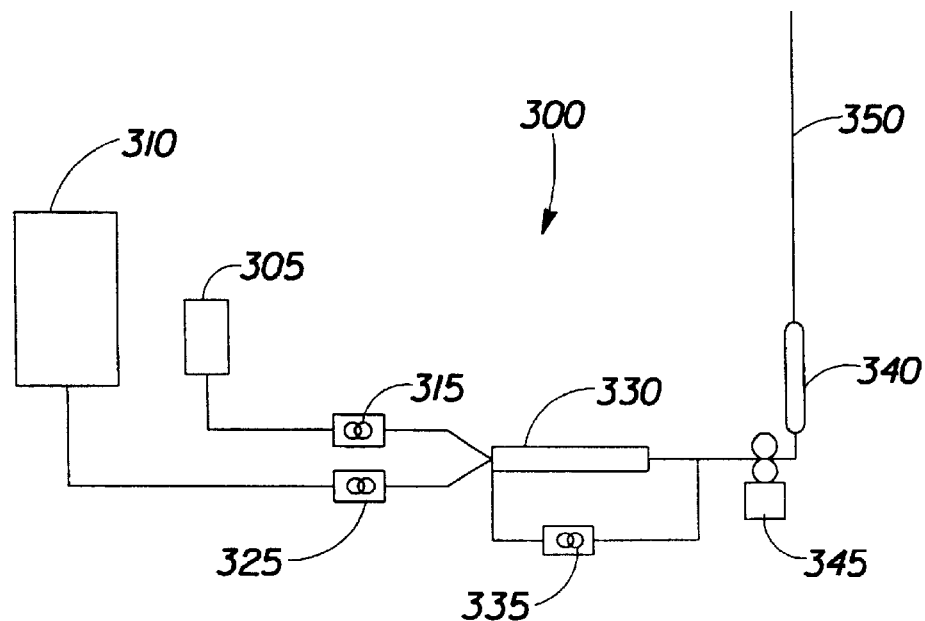
FIG. 8

METHOD FOR CONTINUOUS CURING OF HIPE INTO HIPE FOAMS

This application is a 371 of PCT/USOO/04353 filed Feb. 18, 2000 which claims the benefit of 60/121/152 filed Feb. 22, 1999.

FIELD OF THE INVENTION

This application relates to flexible, microporous, open-celled polymeric foam materials with physical characteristics that make them suitable for a variety of uses. This application particularly relates to methods for continuously curing high internal phase emulsions to form such foams.

BACKGROUND OF THE INVENTION

The development of microporous foams is the subject of substantial commercial interest. Such foams have found utility in various applications, such as thermal, acoustic, electrical, and mechanical (e.g., for cushioning, or packaging) insulators, absorbent materials, filters, membranes, floor mats, toys, carriers for inks, dyes, lubricants, and lotions, and the like. References describing such uses and properties of foams include Oertel, G., *Polyurethane Handbook*, Hanser Publishers, Munich, 1985, and Gibson, L. J.; Ashby, M. F., *Cellular Solids. Structure and Properties*, Pergamon Press, Oxford, 1988. Other uses for foams are generally obvious to one skilled in the art.

Open-celled foams prepared from High Internal Phase Emulsions (hereinafter referred to as "HIPEs") are particularly useful in a variety of applications including absorbent disposable articles (U.S. Pat. No. 5,331,015 (DesMarais et al.) issued Jul. 19, 1994, U.S. Pat. No. 5,260,345 (DesMarais et al.) issued Nov. 9, 1993, U.S. Pat. No. 5,268,224 (DesMarais et al.) issued Dec. 7, 1993, U.S. Pat. No. 5,632,737 (Stone et al.) issued May 27, 1997, U.S. Pat. No. 5,387,207 (Dyer et al.) issued Feb. 7, 1995, U.S. Pat. No. 5,786,395 (Stone et al.) Jul. 28, 1998, U.S. Pat. No. 5,795,921 (Dyer et al.) issued Aug. 18, 1998), insulation (thermal, acoustic, mechanical) (U.S. Pat. No. 5,770,634 (Dyer et al.) issued Jun. 23, 1998, U.S. Pat. No. 5,753,359 (Dyer et al.) issued May 19, 1998, and U.S. Pat. No. 5,633,291 (Dyer et al.) issued May 27, 1997), filtration (Bhumgara. Z. *Filtration & Separation* 1995, Mar., 245–251; Walsh et al. *J. Aerosol Sci*. 1996. 27, 5629–5630; published PCT application W/O 97/37745, published on Oct. 16, 1997, in the name of Shell Oil Co.), and various other uses. The cited patents and references above are incorporated herein by reference. The HIPE process provides facile control over the density, cell and pore size and distribution, proportion of cell struts to windows, and porosity in these foams.

The physical properties of the foam are governed by: (1) the properties of the polymer from which the foam is comprised, (2) the density of the foam, (3) the structure of the foam (i.e. the thickness, shape and aspect ratio of the polymer struts, cell size, pore size, pore size distribution, etc.), and (4) the surface properties of the foam (e.g., whether the surface of the foam is hydrophilic or hydrophobic). Once these parameters have been defined and achieved for a particular application, an economically attractive process for preparing the material is desired. A key aspect of this process is the rate of polymerization and crosslinking, together referred to as curing, of the oil phase of a HIPE to form a crosslinked polymer network. Previously, this curing step required that the emulsion be held at an elevated temperature (40° C.–82° C.) for a relatively long period of time (typically from 2 hours to 18 hours or longer). Such long cure times necessitate relatively low throughput rates, as well as high capital and production costs. Specifically, such long cure times result in a long residence time requirement with attendant large curing chambers for commercially desirable throughput rates.

Previous efforts to devise commercially successful schemes for producing HIPE foams have involved, for example, pouring the HIPE into a large holding vessel which is then placed in a heated area for curing (see for example U.S. Pat. No. 5,250,576 (Desmarais et al.) issued Oct. 5, 1993). U.S. Pat. No. 5,189,070 (Brownscombe et al.), issued Feb. 23, 1993; U.S. Pat. No. 5,290,820 (Brownscombe et al.) issued Mar. 1, 1994; and U.S. Pat. No. 5,252,619 (Brownscombe, et al.) issued Oct. 12, 1993 disclose curing the HIPE in multiple stages. The first stage is conducted at a temperature of less than about 65° C. until the foam reaches a partial state of cure. Then the temperature is increased to between 70° C. and 175° C. to effect final curing rapidly. The whole process takes about 3 hours. Another scheme to produce HIPE foams envisaged placing the emulsion on a layer of impermeable film which would then be coiled and placed in a curing chamber (U.S. Pat. No. 5,670,101 (Nathoo, et al.) issued Sep. 23, 1997). The coiled film/emulsion sandwich could then be cured using the sequential temperature sequence disclosed in the Brownscombe, et al patents discussed above. U.S. Pat. No. 5,849,805 issued in the name of Dyer on Dec. 15, 1998 discloses forming the HIPE at a temperature of 82° C. (pour temperature in Example 2) and curing the HIPE at 82° C. for 2 hours. However, none of these approaches offer the combination of very fast conversion (e.g., in minutes or seconds) from HIPE to polymeric foam that would provide for a relatively simple, low capital process for producing HIPE foams both economically and with the desired set of properties.

The art also discloses using pressure to control the volatility of monomers that, otherwise, would boil off at a suitable polymerization/curing temperature. For example, commonly assigned U.S. Pat. No. 5,767,168, issued to Dyer, et al, on Jun. 16, 1998, discloses the suitability of pressurization to control the volatility of relatively volatile conjugated diene monomers. However, the cure time for the foams disclosed therein is still greater than two hours so there is still substantial opportunity for substantial improvement in curing rate that would improve the economic attractiveness of HIPE foams.

Accordingly, it would be desirable to develop a rapid and efficient process for preparing open-celled polymeric HIPE foam materials with the desired properties. In particular, it would be desirable to develop a continuous process that can produce HIPE foams.

SUMMARY OF THE INVENTION

The present invention relates to a process for obtaining open-celled foams by polymerizing a High Internal Phase Emulsion, or HIPE, which has a relatively small amount of a continuous oil phase and a relatively greater amount of a discontinuous aqueous phase. The present invention particularly relates to relatively high temperature processes for curing the oil phase. This enables the foam to be prepared in a much shorter interval than has heretofore been possible. This enables practical continuous production processes of HIPE foams which have to this point been made via batch processes.

The process of the present invention generally comprises the steps of: 1) forming a water in oil emulsion (HIPE) wherein the oil phase comprises polymerizable monomers; 2) forming the emulsion into a continuous stream; and 3)

polymerizing and crosslinking (i.e. curing) the monomers to form a HIPE foam. Specifically, the oil phase comprises: 1) from about 85 to 99% by weight of a monomer component capable of forming a copolymer having a Tg of about 90° C. or lower, wherein the monomer component comprises a blend of monofunctional monomers, crosslinkng agents, and comonomers capable of modifying foam properties, and 2) from about 1 to about 20% of an emulsifier component capable of forming a stable HIPE. The aqueous phase comprises from about 0.2 to about 40% by weight of a water soluble electrolyte and an effective amount of a polymerization initiator. The volume to weight ratio of aqueous phase to oil phase is between about 8:1 and about 140:1 After curing, the aqueous fraction of the HIPE foam may be removed by a variety of techniques to yield the open-celled, microporous, low density product.

The curing of HIPEs in a relatively short time period at elevated temperatures allows increased production and improved economics relative to previously described methods. Either batch or continuous processes can be used. In either case, because the vapor pressure of both phases in the emulsion increases as the temperature is increased, some containment and/or pressurized system may be required to prevent volatilization of the HIPE components during the high temperature curing and or emulsification steps. If a curing temperature that is greater than the boiling point of one of the HIPE compontent is required to achieve rapid curing of the HIPE, such boiling may form gas or vapor bubbles which may damage the fine structure, particularly the cell size distribution, of the HIPE and resulting HIPE foam. Such volatilization may be avoided by applying pressure from an external source such as a pump or pressurized gas cylinder, by heating the emulsion in a closed container with relatively small headspace volume, by heating a portion of the composition under the surface of the emulsion in an open container such that the "hydrostatic" pressure prevents volatilization of the liquid comprising the emulsion, or by any other method or device generally known to those skilled in the art. Elements of these approaches may be combined to develop a suitable process for rapid curing of HIPE foams.

BRIEF DESCRIPTION OF THE DRAWINGS

FIG. 7 is a schematic diagram of the curing chamber used to prepare foams depicted in FIGS. 1 and 2.

FIG. 8 is a schematic diagram of a continuous process for preparing HIPE foams.

DETAILED DESCRIPTION OF THE INVENTION

I. Definitions

Figure 1:
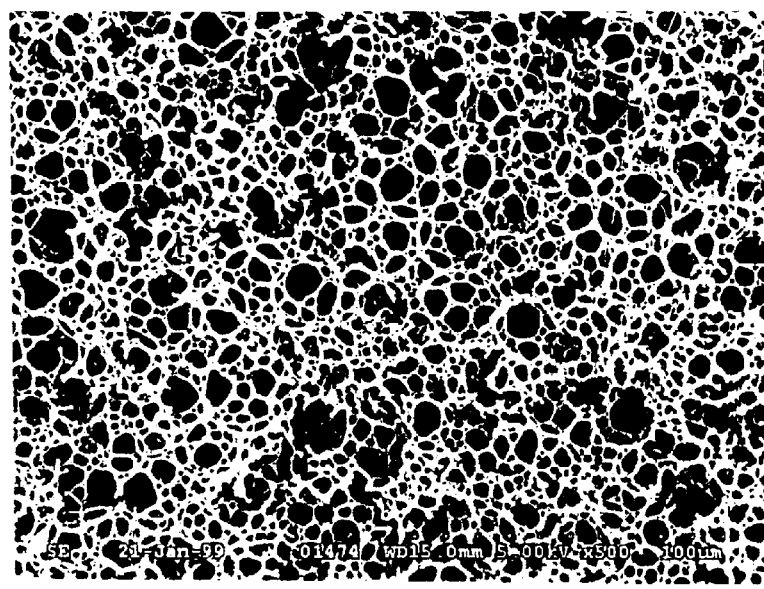
FIG. 1 is an electron photomicrograph at 500× magnification of a control HIPE foam in its expanded state wherein the emulsion was formed at 47° C. and cured at 65° C. under ambient pressure according to the prior art.
Figure 2:
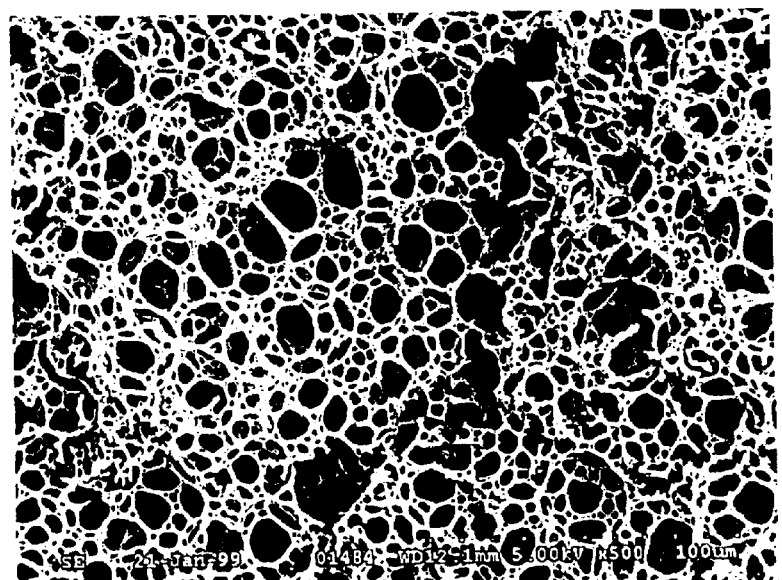
FIG. 2 is an electron photomicrograph at 500× magnification of a representative polymeric foam in its expanded state according to the present invention prepared as described in Example 1.
Figure 3:
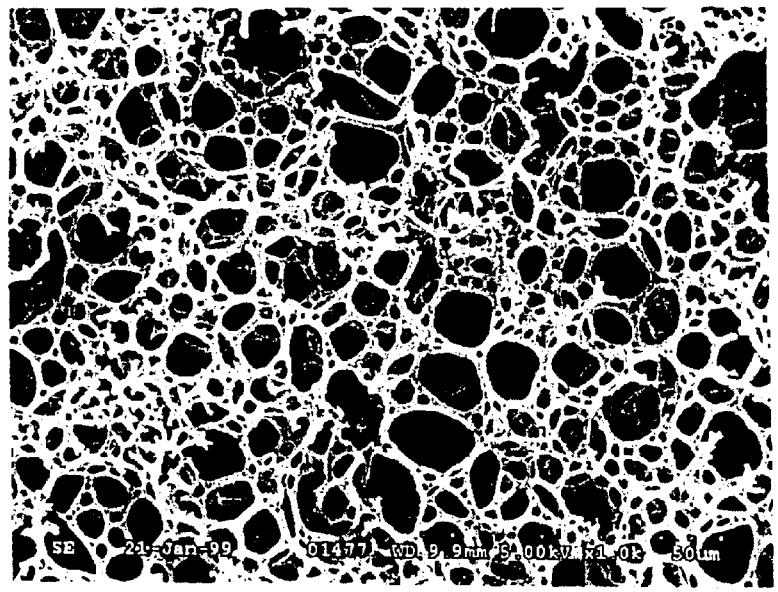
FIG. 3 is an electron photomicrograph at 1000× magnification of a control HIPE foam in its expanded state wherein the emulsion was formed at 47° C. and cured at 65° C. under ambient pressure according to the prior art.
Figure 4:
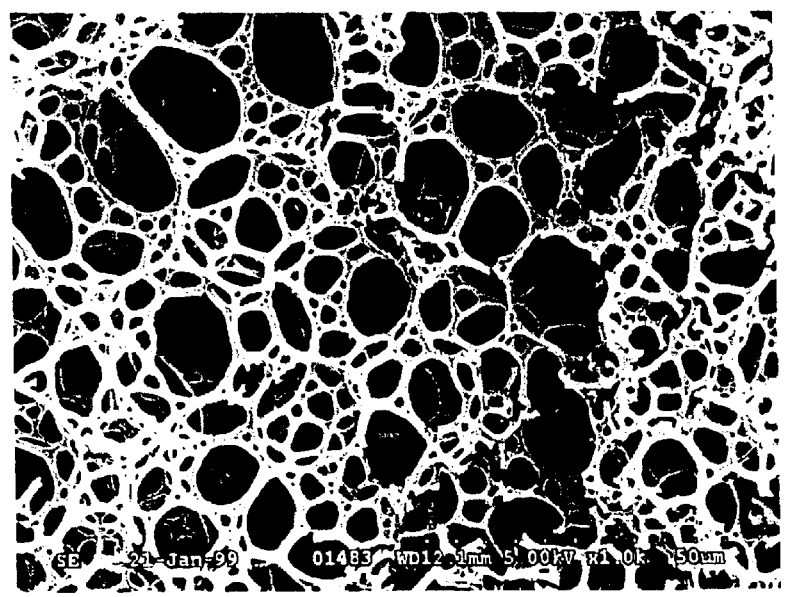
FIG. 4 is an electron photomicrograph at 1000× magnification of a representative polymeric foam in its expanded state according to the present invention prepared as described in Example 1.
Figure 5:
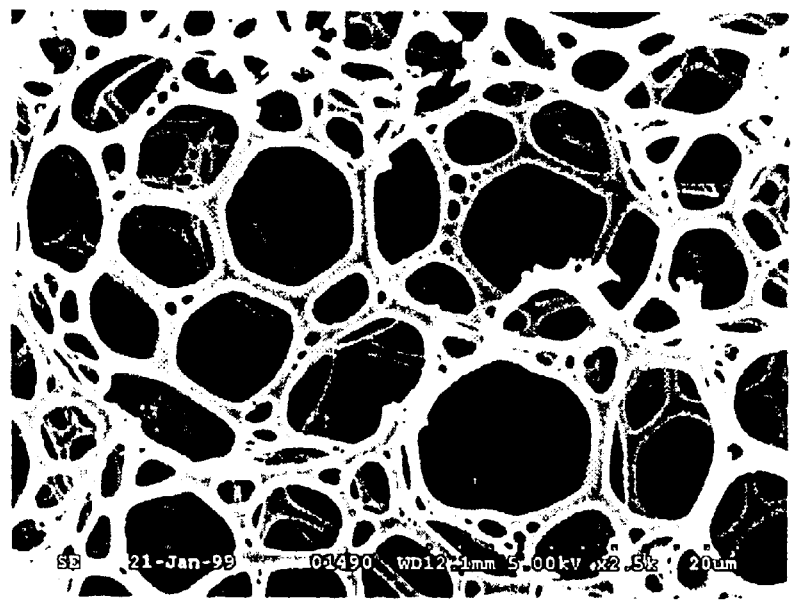
FIG. 5 is an electron photomicrograph at 2500× magnification of a control HIPE foam in its expanded state wherein the emulsion was formed at 47° C. and cured at 65° C. under ambient pressure according to the prior art.
Figure 6:
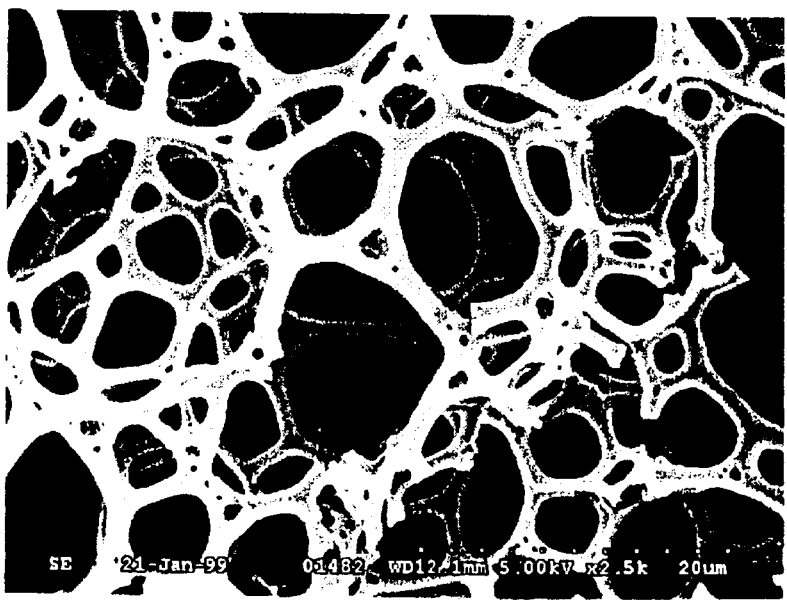
FIG. 6 is an electron photomicrograph at 2500× magnification of a representative polymeric foam in its expanded state according to the present invention prepared as described in Example 1.

The following definitions are offered relative to the current invention.

"Curing" is the process of converting a HIPE to a HIPE foam. Curing involves the polymerization of monomers into polymers. A further step included in the curing process is crosslinking. A cured HIPE foam is one which has the physical properties, e.g., mechanical integrity, to be handled in subsequent processing steps (which may include a post-curing treatment to confer the final properties desired). Generally, curing is effected via the application of heat. An indication of the extent of cure is the mechanical strength of the foam, as measured by the yield stress described in the Test Methods section below.

"Polymerization" is the part of the curing process whereby the monomers of the oil phase are converted to a relatively high molecular weight polymer.

"Crosslinking" is the part of the curing process whereby the monomers having more than one functional group with respect to free radical polymerization are copolymerized into more than one chain of the growing polymer.

"Hydrostatic" relates to pressure conferred by a column of liquid in a gravitational field, sometimes referred to as "hydrostatic head". The liquid is not necessarily water, but may be an aqueous solution, emulsion, suspension or other liquid.

I. Polymeric Foam Derived From a High Internal Phase Emulsion

A. General Foam Characteristics

1. Oil Phase Components

The continuous oil phase of the HIPE comprises monomers that are polymerized to form the solid foam structure and the emulsifier necessary to stabilize the emulsion. In general, the monomers will include from about 20 to about 95% by weight of at least one substantially water-insoluble monofunctional monomer capable of forming an atactic amorphous polymer having a glass transition temperature (Tg) of about 35° C. or lower. This comonomer is added to lower the overall Tg of the resulting HIPE foam. Exemplary monomers of this type include $C_4$–$C_{14}$ alkyl acrylates and $C_6$–$C_{16}$ methacrylates such as 2-ethylhexyl acrylate, n-butyl acrylate, hexyl acrylate, n-octyl acrylate, nonyl acrylate, decyl acrylate, isodecyl acrylate, tetradecyl acrylate, benzyl acrylate, nonyl phenyl acrylate, hexyl methacrylate, octyl methacrylate, nonyl methacrylate, decyl methacrylate, iso-decyl methacrylate, dodecyl methacrylate, and tetradecyl methacrylate; substituted acrylamides, such as N-octadecyl acrylamide; dienes such as isoprene, butadiene, chloroprene, piperylene, 1,3,7-octatriene, β-myrcene and amyl butadiene; substituted $C_4$–$C_{12}$ styrenics such as p-n-octyl styrene; and combinations of such monomers. The Tg lowering monofunctional monomers will generally comprise 20% to about 95%, more preferably 45% to about 65%, by weight of the monomer component.

The oil phase will also comprise from about 5 to about 80% by weight of a first substantially water-insoluble, polyfunctional crosslinking agent. This comonomer is added to confer strength to the resulting HIPE foam. Exemplary crosslinking monomers of this type encompass a wide variety of monomers containing two or more activated vinyl groups, such as the divinyl benzenes and analogs thereof. These analogs include mp-divinyl benzene mixtures with ethyl styrene, divinyl naphthalene, trivinyl benzene, divinyl alkyl benzenes, divinyl biphenyls, divinyl phenyl ethers, divinyl ferrocenes, divinyl furans, and the like. Other useful crosslinking agents may be selected from a group derived from the reaction of acrylic acid or methacrylic acid with polyfunctional alcohols and amines. Nonlimiting examples of this group include 1,6-hexanedioldiacrylate, 1,4-butanedioldimethacrylate, trimethylolpropane triacrylate, hexamethylene bisacrylamide, and the like. Other examples of crosslinking monomers include divinyl sulfide, divinyl sulfone, and trivinyl phosphine. Other crosslinkers useful in this regard are well known to those skilled in the art. It should be noted that the weight fraction of the crosslinking component is calculated on the basis of the pure crosslinker in cases wherein the crosslinking monomer is commonly used as a mixture (e.g., divinyl benzene often is a 55% pure mixture with the balance being ethyl styrene).

Any third substantially water-insoluble comonomer may be added to the oil phase in weight percentages of from about 0% to about 70%, preferably from about 15% to about 40%, to modify properties in other ways. In certain cases, "toughening" monomers may be desired which impart toughness to the resulting HIPE foam equivalent to that provided by styrene. These include styrenics such as styrene and ethyl styrene and methyl methacrylate. Also include are styrenics and other compounds which may also help reduce the Tg or enhance the strength of the resulting HIPE foam such as p-n-octyl styrene. Monomers may be added to confer flame retardancy as disclosed in commonly PCT application WO 00/04080, published in the name or Dyer on Jan. 27, 2000. Monomers may be added to confer color, fluorescent properties, radiation resistance, opacity to radiation (e.g., lead tetraacrylate), to disperse charge, to reflect incident infrared light, to absorb radio waves, to form a wettable surface on the HIPE foam struts, or for any other purpose.

2. Aqueous Phase Components

The discontinuous internal phase of the HIPE is generally an aqueous solution containing one or more dissolved components. One essential dissolved component of the water phase is a water-soluble electrolyte. The dissolved electrolyte minimizes the tendency of monomers, comonomers, and crosslinkers that are primarily oil soluble to also dissolve in the water phase.

The aqueous phase also preferably comprises a water-soluble free-radical initiator as may be known to the art. The initiator can be present at up to about 20 mole percent based on the total moles of polymerizable monomers present in the oil phase. More preferably, the initiator is present in an amount of from about 0.001 to about 10 mole percent based on the total moles of polymerizable monomers in the oil phase. Suitable initiators include ammonium persulfate, potassium persulfate, hydrogen peroxide, and peroxyacetic acid.

3. Emulsifier

The emulsifier is necessary for forming and stabilizing the HIPE. The emulsifier is generally included in the oil phase and tends to be relatively hydrophobic in character. (See for example Williams, J. M., *Langmuir* 1991, 7, 1370–1377, incorporated herein by reference.) An example emulsifier which functions very well is diglycerol monooleate. Other emulsifiers of this general sort also include diglycerol monomyristate, diglycerol monoisostearate, diglycerol monoesters of coconut fatty acids, sorbitan monooleate, sorbitan monomyristate, sorbitan monoesters of coconut fatty acids, sorbitan isostearate, and like compounds and mixtures thereof. U.S. Pat. No. 5,786,395 (Stone et al.) issued Jul. 28, 1998 offer further examples of these emulsifiers and is incorporated herein by reference. Such emulsifiers are advantageously added to the oil phase so that it comprises between about 1% and about 15% thereof. Obviously, emulsifiers that are particularly able to stabilize HIPEs at high temperatures are preferred. Diglycerol monooleate is exemplary in this respect.

Coemulsifiers may also be used to provide additional control of cell size, cell size distribution, and emulsion stability. Exemplary coemulsifiers include phosphatidyl cholines and phosphatidyl choline-containing compositions, aliphatic betaines, long chain $C_{12}$–$C_{22}$ dialiphatic, short chain $C_1$–$C_4$ dialiphatic quaternary ammonium salts, long chain $C_{12}$–$C_{22}$ dialkoyl(alkenoyl)-2-hydroxyethyl, short chain $C_1$–$C_4$ dialiphatic quaternary ammonium salts, long chain $C_{12}$–$C_{22}$ dialiphatic imidazolinium quaternary ammonium salts, short chain $C_1$–$C_4$ dialiphatic, long chain $C_{12}$–$C_{22}$ monoaliphatic benzyl quaternary ammonium salts, the long chain $C_{12}$–$C_{22}$ dialkoyl(alkenoyl)-2-aminoethyl, short chain $C_1$–$C_4$ monoaliphatic, short chain $C_1$–$C_4$ monohydroxyaliphatic quaternary ammonium salts Particularly preferred is ditallowdimethyl ammonium methyl sulfate. Such coemulsifiers and additional examples arc described in greater detail in U.S. Pat. No. 5,650,222, (DesMarais, et al.) issued on Jul. 22, 1997, the disclosure of which is incorporated herein by reference.

4. Optional Ingredients

Various optional ingredients may also be included in either the water or oil phase for various reasons. Examples include antioxidants (e.g., hindered phenolics, hindered amine light stabilizers, UV absorbers), plasticizers (e.g., dioctyl phthalate, dinonyl sebacate), flame retardants (e.g., halogenated hydrocarbons, phosphates, borates, inorganic salts such as antimony trioxide or ammonium phosphate or magnesium hydroxide), dyes and pigments, fluorescers, filler particles (e.g., starch, titanium dioxide, carbon black, or calcium carbonate), fibers, chain transfer agents, odor absorbers such as activated carbon particulates, dissolved polymers and oliogomers, and such other agents as are commonly added to polymers for a variety of reasons. Such additives may be added to confer color, fluorescent properties, radiation resistance, opacity to radiation (e.g., lead compounds), to disperse charge, to reflect incident infrared light, to absorb radio waves, to form a wettable surface on the HIPE foam struts, or for any other purpose.

B. Processing Conditions for Obtaining HIPE Foams

Foam preparation typically involves the steps of: 1) forming a stable high internal phase emulsion (HIPE); 2) curing this stable emulsion under conditions suitable for forming a cellular polymeric structure; 3) optionally squeezing and washing the cellular polymeric structure to remove the original residual water phase from the polymeric foam structure and, if necessary, treating the polymeric foam structure with a hydrophilizing surfactant and/or hydratable salt to deposit any needed hydrophilizing surfactant/hydratable salt, and 4) thereafter dewatering this polymeric foam structure.

1. Formation of HIPE

The HIPE is formed by combining the water and oil phase components in a ratio between about 8:1 and 140:1. Preferably, the ratio is between about 10:1 and about 75:1, more preferably between about 13:1 and about 65:1. As discussed above, the oil phase will typically contain the requisite monomers, comonomers, crosslinkers, and emulsifiers, as well as optional components. The water phase will typically contain electrolyte or electrolytes and polymerization initiator or initiators.

The HIPE can be formed from the combined oil and water phases by subjecting these combined phases to shear agitation. Shear agitation is generally applied to the extent and for a time period necessary to form a stable emulsion. Such a process is preferably a continuous process and is generally carried out under conditions suitable for forming an emulsion where the water phase droplets are dispersed to such an extent that the resulting polymeric foam will have the requisite structural characteristics. Emulsification of the oil and water phase combination will frequently involve the use of a mixing or agitation device such as an impeller.

One preferred method of forming HIPE involves a continuous process that combines and emulsifies the requisite oil and water phases. In such a process, a liquid stream comprising the oil phase is formed. Concurrently, a separate liquid stream comprising the water phase is also formed. The two separate streams are provided to a suitable mixing chamber or zone at a suitable emulsification pressure and combined therein such that the requisite water to oil phase weight ratios previously specified are achieved.

In the mixing chamber or zone, the combined streams are generally subjected to shear agitation provided, for example, by an impeller of suitable configuration and dimensions, or by any other means of imparting shear or turbulent mixing generally known to those skilled in the art. Shear will typically be applied to the combined oil/water phase stream at an appropriate rate and extent. Once formed, the stable liquid HIPE can then be withdrawn or pumped from the mixing chamber or zone. This preferred method for forming HIPEs via a continuous process is described in greater detail in U.S. Pat. No. 5,149,720 (DesMarais et al.), issued Sep. 22, 1992, which is incorporated by reference. See also commonly assigned U.S. Pat. No. 5,827,909 (DesMarais) issued on Oct. 27, 1998 (incorporated herein by reference), which describes an improved continuous process having a recirculation loop for the HIPE. The process also allows for the formation of two or more different kinds of HIPEs in the same vessel as disclosed in U.S. Pat. No. 5,817,704 (Shiveley et al.) issued Oct. 6, 1998, incorporated herein by reference. In this example, two or more pairs of oil and water streams may be independently mixed and then blended as required. Alternatively, in-line mixing techniques as described in U.S. Provisional Patent application Serial No. 60/158,620, filed in the names of Catalfamo, et al, on Oct. 8, 1999 may be used.

In an alternative process, where a water soluble polymerization initiator is not employed, an oil soluble initiator may be injected into the HIPE after formation thereof. Such a process may be desirable to minimize initiator decomposition products in the water phase to facilitate recycling thereof. Suitable initiatiors may have a relatively high ten hour half-life temperature and include, for example, benzoyl peroxide, amyl peroxide, cumyl hydroperoxide, acetyl peroxide, decanoyl peroxide, toluene sulfonyl peroxide, and the like, including mixtures of such initiators.

2. Polymerization/Curing of the Oil Phase of the HIPE

The present invention relates to continuous polymerization/curing of the oil phase of the emulsion.

A measure of the extent of cure of the polymer is the strength of the foam, as measured by the yield stress described in the Test Methods section below. Another measure of the extent of cure of the polymer is the extent to which it swells in a good solvent such as toluene (being crosslinked, the HIPE foam does not dissolve without being chemically altered).

Without being bound by theory, it is believed that curing comprises two overlapping but distinct processes. The first involves polymerization of the monomers. The second the formation of crosslinks between active sites on adjacent polymer backbones. Crosslinking is essential to the formation of HIPE foams with strength and integrity essential to their further handling and use. The rate controlling step of this crosslinking reaction is believed to be related to the rate of diffusion of the active sites attached to the polymer chains. It has been discovered surprisingly that an increase in the rate of production of free-radicals in the HIPE does not accelerate curing usefully. However, increasing the diffusion rate of the active sites by increasing the temperature of the system in a conventional curing process is limited by the volatility of the components of the emulsion. The current invention provides for curing the emulsion under an elevated pressure in order to allow high temperatures and rapid cure times to be attained without excessive volatilization of the emulsion components.

It should be noted that as the temperature of the system is increased, both the rates of polymerization and depolymerization typically increase. At some elevated temperature, the rates of polymerization of the monomers and depolymerization of the polymer may become equal under the specific curing conditions. This is analogous to the ceiling temperature observed for many polymerization systems under a pressure of 1 atmosphere (see "Textbook of Polymer Science, $2^{nd}$ Ed." 1971, pp. 306, F. W. Billmeyer, John Wiley & Sons, New York). This limits the practical upper limit of the curing temperature for a particular system.

The following describes exemplary nonlimiting embodiments of a first aspect of this invention. In the first embodiment, the HIPE is formed in a batchwise process, as described in Example 1 below. The formed HIPE is transferred to a suitable reaction vessel 200, such as that shown in FIG. 7, capable of withstanding pressures (typically from about 2 to about 40 atmospheres) necessary to enable curing at the desired temperature (typically from about 90° to about 250° C.). As will be recognized, such pressure is necessary to prevent volatilization or evaporation of one or more of the HIPE components. The temperature at which the HIPE is provided to the vessel may be significantly lower than the polymerization/curing temperature.

FIG. 7 is an exemplary reaction vessel 200 that is suitable for batch curing of HIPEs according to the present invention. The vessel 200 comprises a vessel body 210 having sufficient volume to cure the desired amount of HIPE. The vessel body can have any desired shape including cylindrical, cubic, rectangular solid, or other irregular shape as may be desired. The container should be constructed such that the polymerized/cured solid foam material can be easily removed for further processing after polymerization/curing has been carried out to the extent desired. For certain purposes where the cured HIPE is further processed into a web of material by cutting it as is described in U.S. patent application Ser. No. 08/939,172, filed in the name of Sabatelli, et al. on Sep. 29, 1997, a cylindrical shape has been found to be useful. The vessel closure 220 has a shape that is complementary to the shape of the vessel body 210 so as to provide a closure therefor. The seal 230 is interposed between the closure 220 and the body 210 to provide resistance to leakage of materials enclosed in the reaction vessel 200 during the curing process. The vessel 200 should be constructed of materials that are capable of withstanding the pressures necessary to cure the HIPE at the desired temperature as is discussed above. Closure means (not shown) capable of resisting such pressure are also necessary in order to maintain the vessel 200 in a sealed condition during the curing process.

The vessel 200 may further be lined with a material compatible with the HIPE so that it does not cause the HIPE to degrade at the interior surfaces of the vessel which contact the HIPE. Exemplary surfaces in this regard include: stainless steel, titanium, glass, polyethylene, polypropylene, and polytetrafluoroethylene. One of skill in the art will recognize that the choice of materials will depend on the environmental factors that the material will experience. For example, curing temperatures greater than the softening point of a polymer surface would render a polymeric lining unsuitable. For curing conditions requiring the surface to be exposed to high concentration of chloride ion (from the aqueous phase of the HIPE) and the combination of high pressure and temperature which provides the accelerated curing described herein, a titanium surface is suitable.

The vessel 200 is filled with HIPE so as to minimize headspace volume before being sealed. Minimizing the headspace volume limits the extent to which volatilization of the emulsion components can occur. The vessel 200 may be pressurized simply by heating the container and its contents, for example in an oven. In such a case, the pressure inside the container is determined by the partial vapor pressures of the components of the emulsion.

Alternatively, pressure can be introduced through an appropriate valve from an external pressure source such as a pump which can provide an incompatible fluid to raise the pressure or using a pressurized gas cylinder.

Suitable curing conditions will vary depending upon the composition of the oil and aqueous phases of the emulsion (especially the emulsifier systems used), the type and amounts of polymerization initiators used, the desired curing time, and other factors as may be identified. For example, for rapid curing, suitable curing conditions will involve maintaining the HIPE at elevated temperatures above about 90° C., more preferably above about 100° C., most preferably between about 125° C. and 165° C. (2.5 to 7 atmospheres), for a time period ranging from about 20 seconds to about 1 hour, more preferably from about 40 seconds to about 20 minutes, most preferably from about 1 minute to about 10 minutes.

FIGS. 1–6 are photomicrographs that compare exemplary foams produced according to the prior art and according to the present invention as described in Example 1 at various magnifications. Specifically, the foam of FIGS. 1, 3, and 5 was produced according to Condition 2 of Example 1 and the foam of FIGS. 2, 4, and 6 was produced according to Condition 7 of Example 1. As can be seen by comparing the process conditions given in table 1, the only substantial difference in curing is the curing temperature, with the resulting reduction in curing time. As is clearly evident from the property data in Table 1 below and by comparing the various pairs of figures, the rapid curing process of the present invention provides foams having essentially the same properties as foams produced according to the prior art using curing processes that required substantially longer curing times.

In alternative embodiments of the batchwise process, a plurality of reaction vessels 200 may be attached, for example, to a continuous belt or other transport device which moves the vessels from a HIPE filling station through a heating zone to a section which ejects the cured HIPE foam to a processing line and carries the containers back to the filling zone (after any washing process that may be needed to restore the containers to usable condition).

Figure 9:
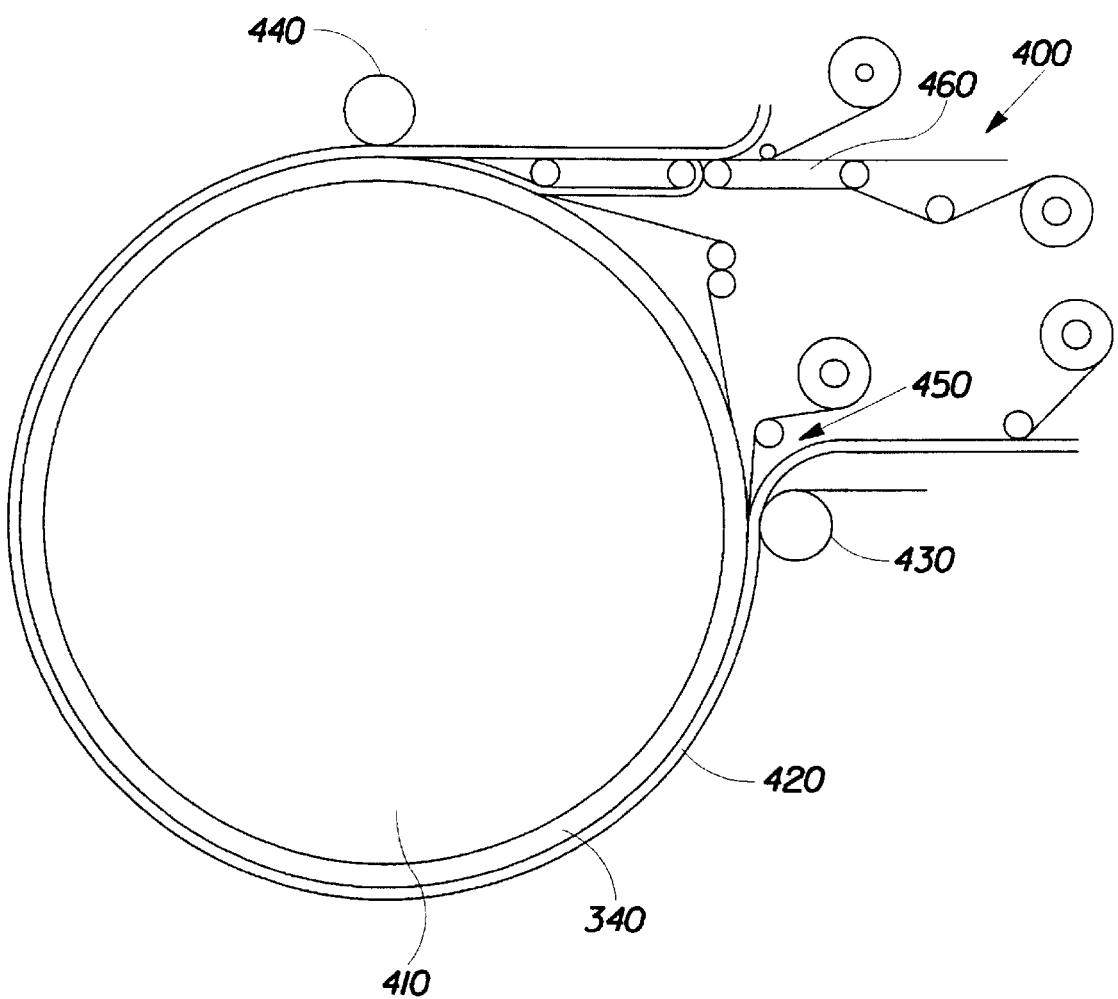
FIG. 9 is a schematic diagram of an alternative continuous process for preparing HIPE foams.

In a second embodiment of the present invention, the HIPE is formed in a continuous process, as is shown schematically in FIGS. 8 and 9 and described in Example 2 below.

FIG. 8 describes one method and an apparatus 300 suitable for continuously forming HIPE foams according to the present invention. A HIPE is made using the methods generally described in the aforementioned U.S. Pat. Nos. 5,149,720 and 5,827,909. That is, the oil phase (desired blend of monomers and emulsifier) is prepared and stored in an oil phase supply vessel 305. Similarly, the desired aqueous phase (blend of water, electrolyte and initiator) is prepared and stored in an aqueous phase supply vessel 310. The oil phase and the aqueous phase are supplied in the desired proportions to mixhead 330 by an oil phase supply pump 315 and an aqueous phase supply pump 325. The mixhead 330 supplies the mechanical energy (shear) necessary to form the HIPE. If desired, a HIPE recirculation pump 335 can be used.

The formed HIPE is pumped into an elongated curing chamber 340 with specific cross-sectional shape and dimensions as desired for the foam product. The oil phase supply pump 315 and the aqueous phase supply pump may be used to pump the HIPE from the mixhead 330 to the curing chamber 340. In this case, emulsification will occur at substantially the curing pressure. One of skill in the art will recognize that the emulsification pressure must be somewhat greater than curing pressure to enable flow to occur. Alternatively, an optional booster pump 345 may be used to pump the HIPE from the mixhead 330 to the curing chamber 340. In this case emulsification may occur at a lower pressure and/or temperature than the curing step.

In an alternative embodiment of the present invention (not shown), multiple systems, similar to those described above, can be used to make multiple HIPEs having different combinations of properties (e.g, pore dimensions, mechanical properties, etc.). Such multiple HIPEs can be introduced into the curing chamber 340 so as to provided a cured foam having regions of varying properties as may be desired for a particular end use.

The chamber 340 may further be lined with a material compatible with the HIPE so that it does not cause degradation of the HIPE structure at the interior surfaces which contact the HIPE, and is not degraded by the oil or water phase components at the elevated temperatures intended. Optionally, a slip layer may be provided between the curing HIPE and the chamber walls to minimize uneven flow patterns as the HIPE progresses through the chamber 340. As with the lining discussed above, the slip layer must be compatible with the oil and water phase components of the HIPE and have sufficient mechanical stability at the curing temperature so as to be effective. Such a slip layer has particular utility when used with curing chamber designs incorporating the "hydrostatic head" as are discussed below.

At least a portion of the chamber 340 may be heated in order to bring the HIPE to the intended curing temperature or help maintain the HIPE at the curing temperature as it passes through this section or zone. Any manner of heating this section or zone may be employed in order to reach and maintain the desired temperature in a controlled fashion. Examples include heating by resistive electrical elements, steam, hot oil or other fluids, hot air or other gases, or any other method of heating known to those skilled in the art. Optionally, a static mixer/heat exchanger or other forced convection heat exchanger can be utilized in the heated section to improve heat transfer into the HIPE. Once the HIPE begins to gel, the composition can no longer be mixed because of the risk of damaging or even destroying the structure of the foam. Suitably, the HIPE in the curing chamber 340 is heated to a temperature between about 40° C. and about 250° C. Preferably, the HIPE in the curing chamber 340 is heated to a temperature greater than about 65° C., preferably greater than about 75° C., more preferably greater than about 85° C. As will be discussed below the HIPE may be heated to temperatures greater than 100° C. if the curing chamber 340 is provided with means to withstand the additional pressure therein.

The chamber 340 should be designed such that the pressure within the chamber 340 under steady state conditions is sufficient to prevent volatilization of the emulsion components at the cure temperature. Depending on the curing temperature, the pumping pressure may only be determined by frictional forces within the curing chamber 340. That is, when the curing temperature is less than the volatilization temperature of any of the HIPE components, the key factor that defines the required pumping pressure is the resistance to flow due to frictional forces (e.g, because the water phase is the primary component of the HIPEs described herein, curing at a temperature less than 100° C. in essence means that frictional forces define the pressure required to move the HIPE through the curing chamber 340). At higher curing temperatures (i.e. those greater than 100° C.) additional pressure may be required to prevent volatilization.

The chamber 340 may be in a horizontal, inclined, or vertical position. The inclined and vertical orientations may be employed to provide additional "hydrostatic" pressure to help prevent the volatilization of HIPE components, thereby allowing a higher curing temperature and resulting shorter curing chamber to be employed.

The length of the optional heated section, the temperature of the optional heated section and the rate at which the emulsion is pumped through the section are selected to allow for sufficient residence time within the chamber 340 for adequate heat transfer to the center of the chamber 340 in order to attain complete cure. If the optional heating is done in chamber 340, then a relatively thin cross-sectional dimension is preferred for the heated portion of chamber 340 in order to facilitate rapid heat transfer. The HIPE is sufficiently cured so as to be mechanically stable for further processing (i.e. has been formed into a nascent HIPE foam) which will complete curing the HIPE into a HIPE foam by the time it exits the curing chamber 340.

Optionally, an elevated extension 350 may be located above and downstream of the curing chamber 340 so as to help maintain an elevated pressure in the curing chamber 340. Such elevated section 350 may also provide addditional residence time for completion of curing. The elevated section 350 may have any desired orientation (i.e. the angle defined by a line connecting the exit of the curing chamber 340 with the exit of extension 350 can vary between an angle greater than 0 degrees and ninty degrees as desired.). Such optional extension 350 is particularly useful with the "U-tube" configuration discussed below. Alternatively, if curing at atmospheric pressure is desired, such extension 350 may lie at the same elevation as the curing chamber 340. Such extension 350 may also be provided with insulation or heating as may be required to help maintain the HIPE or nascent HIPE foam at a desired curing temperature.

In another embodiment (not shown) of the present invention, the oil phase supply pump 315 and/or the aqueous phase supply pump 325 may be situated at a higher elevation than the entrance to the curing chamber 340. A relatively high pressure may be achieved in the curing chamber by utilizing a "U-tube" configuration where the supply pumps 315, 325 and the extension at the exit of the curing chamber 350 are elevated with respect to the curing chamber 340 itself. In such a configuration, the supply pumps 315, 325 may operate at a lower pressure than the pressure in the curing chamber 340 (i.e. the pressure head that the pumps need to overcome is lower). The supply pumps 315, 325 may be at a lower elevation than the extension at the exit of the curing chamber 350, at the same elevation, or at a higher elevation. In an embodiment where the supply pumps 315, 325 are at a higher elevation than the extension at the exit of the curing chamber 340, the differential pressure or "head" will assist in providing a driving force for flow through the system.

The curing chamber 340 can have any desired cross section that is consistent with the flow requirements of pumping the curing HIPE. For example, the cross section can be rectangular, circular, triangular, annular, oval, hourglass, dog bone, asymmetric, etc., as may be desired for a particular use of the cured HIPE. In one preferred embodiment, the cross sectional dimensions of the chamber 340 are such that the polymerized HIPE foam is produced in sheet-like form with the desired cross-sectional dimensions. Alternatively, the cross-sectional shape can be designed to facilitate manufacture of the desired product in subsequent processes. For example, an hourglass-shaped cross-section (or conjoined hourglass sections) of the appropriate size may facilitate making disposable absorbent products such as diapers by cutting relatively thin slices or sheets of the shaped HIPE foam. Other sizes and shapes may be prepared for making feminine hygiene pads, surgical drapes, face masks, and the like. Regardless of the cross-sectional dimensions of the curing chamber 340, the resultant HIPE foam may be cut or sliced into a sheet-like form with thickness suitable for the intended application. For example, a rectangular form having a thickness suitable for slicing into a plurality of individual sheets could be prepared and the form sliced into such sheets which are then separately dewatered and dried as described below after slicing.

In one embodiment, the curing chamber 340 can comprise the volume between a pair of parallel plates where the plates are separated by the desired thickness of the cured HIPE foam. As will be recognized such a configuration provides the curing chamber 340 with a rectangular cross section having a very large width:thickness aspect ratio so as to cure the HIPE into a web form HIPE foam. It should also be noted that such plates need to have sufficient rigidity to resist deformation by any internal curing pressures. The volume of the curing chamber is defined by the required residence time (controls length for a given throughput) to provide sufficient polymerization and crosslinking to insure the HIPE has sufficient mechanical stability for further processing (This does not necessarily mean that curing is substantially complete when the HIPE/HIPE foam exits the curing chamber, just that curing is sufficiently complete to provide mechanical stability.), the desired thickness of the web, and the desired width of the web.

In another embodiment the curing chamber 340 can have an annular cross section with a volume defined by: wall separation, determined by desired thickness of the cured HIPE foam; chamber length, defined by desired residence time; and chamber circumference, defined by a combination of desired web width and minimization of curl in the cured HIPE foam. As will be recognized, a minimum circumference is required so that the cured HIPE foam will be substantially flat if it is further processed into a sheet form by slitting the cured foam and laying the slit foam flat after the foam exits the curing chamber 340. It is believed that a diameter of greater than about 0.5 meter is desirable to minimize curl of the HIPE foam produced using such an annular curing chamber will be subsequently slit into a sheet form having a thickness of less than about 5 mm. As will be recognized, a greater diameter may be required for web thicknesses greater than 5 mm. Alternatively, the curing chamber can have any desired diameter if the HIPE foam is to be used in a tubular form.

In a third embodiment, the curing chamber 340 can comprise the space between a curing drum and a confining web. Such an embodiment is shown as curing apparatus 400 in FIG. 9. In this embodiment, the volume of the curing chamber 340 is defined by the separation between the curing drum 410 and the confining web 420 (determined by the desired thickness of the cured HIPE foam), the desired width of the web of HIPE foam to be produced, and a combination of curing drum 410 diameter (a minimum diameter of 0.5 meter is desired to minimize curl in the cured HIPE foam), curing arc (i.e the portion of the circumference of curing drum 410 between confining rolls 430 and 440 which associate the confining web 420 with the curing drum 410) and desired residence time. In this embodiment, the HIPE is distributed in trough 450 that is formed at the nip where confining roll 430 first associates the confining web 420 with the curing drum 410. The HIPE is carried into the curing chamber 410 where it is cured into a HIPE foam as it progresses around the curing arc. If necessary, the curing drum 410 may be heated (eg by interior steam) to provide any energy necessary to cure the HIPE. At confining roll 440, the confining web 420 is stripped from the cured HIPE foam and the cured HIPE foam is stripped from the curing drum 410 and carried away on belt 460 for downstream processing. It should also be noted that the curing drum 410 or the confining web 420 can be provided with three dimensional depressions so as to form the HIPE into a three dimensional HIPE foam structure.

As will be recognized, it may be necessary to place slip elements between the HIPE foam and elements of the apparatus that forms the curing chamber 340.

In one embodiment of a slip element, a carrier web (not shown) could be placed between the parallel plates discussed above to minimize friction (i.e. shear forces adjacent to the wall of the curing chamber 340) between the HIPE and the plates that may distort the cells of the HIPE causing variation in cell properties in the cured HIPE foam. Such carrier webs could also be used to carry the HIPE around the curing drum 410 described above in embodiments where the curing drum 410 does not rotate (e.g. so as to enable zones in the curing chamber 340 having different temperatures). As will be recognized, it may be necessary to provide means to reduce friction (e.g. a pressurized gas or a liquid) between the carrier web and the walls of the curing chamber 340.

Alternatively, the slip element could comprise a thin layer of the water phase that is injected between the walls of the curing chamber 340 and the HIPE confined therein. Such a layer of the water phase can act as a lubricant allowing the partially cured HIPE to pass through the curing chamber 340 with minimal distortion of the cells.

These and other embodiments of a slip element are considered to be within the scope of the present invention.

The cross-section of the curing chamber 340 may be varied along the length of the chamber in order to increase or decrease the pressure required to pump the HIPE through the chamber. For example, the cross-sectional area of a vertical curing chamber may be increased above the point at which the HIPE foam is cured, in order to reduce the resistance to flow caused by friction between the walls of the chamber and the cured foam. Alternatively, the cross-sectional area of a curing chamber 340 may be decreased past the point at which the HIPE foam is cured, in order to increase the pressure required to pump the HIPE through the chamber thereby allowing a shorter curing chamber to be employed. As will be recognized, it will be necessary to provide means to remove a portion of the incompressible water phase as the web passes through the portion of the curing chamber having a reduced cross sectional area and is compressed thereby.

A solution of initiator can optionally be injected into the HIPE at a point between the mixhead 330 and the curing chamber 340 (not shown). If the optional injection of initiator is chosen, the HIPE, as provided from the mixhead 330, may be substantially initiator free. Additional mixing means, such as a continuous mixer (not shown) may also be desirable downstream of the injection point and upstream of the curing chamber 340 to ensure the initiator solution is distributed throughout the HIPE. Such an arrangement has the advantage of substantially reducing the risk of undesirable curing in the mixhead 330 in the event of an unanticipated equipment shutdown.

A porous, water-filled, open-celled HIPE foam is the product obtained after curing in the reaction chamber. As noted above, the cross sectional dimensions of the chamber 340 are preferably such that the polymerized HIPE foam is produced in sheet-like form with the desired cross-sectional dimensions. Alternative cross-sectional dimensions (e.g., billets, cylinders, or other desired shape) may be employed, but regardless of the shape of the curing chamber 340, the resultant HIPE foam may be cut or sliced into a sheet-like form with a desired thickness or into such other form as desired that may be suitable for the intended application (e.g. comminution into particles).

Sheets of cured HIPE foam are easier to process during subsequent treating/washing and dewatering steps, as well as to prepare the HIPE foam for use in the intended application. Alternatively, the product HIPE foam may be cut, ground or otherwise comminuted into particles, cubes, rods, spheres, plates, strands, fibers, or other desired shapes.

The aqueous phase remaining with the HIPE is typically removed by compressing the foam and/or exposing the foam to a vacuum source. Residual moisture can be removed as desired by conventional evaporative drying techniques.

As noted above, in the continuous curing process, the emulsification step may be carried out at a relatively low pressure and the pre-formed emulsion pumped into the curing chamber under relatively high pressure using booster pump 345. An alternative process entails pumping the oil phase and the aqueous phase into the mixing chamber under relatively high pressure using oil phase supply pump 315 and aqueous phase supply pump 325. In this case, the emulsification step occurs under relatively high pressure, and the emulsion exits from the mixing chamber directly into the curing chamber under the requisite pressure. This eliminates the need to actively pump the pre-formed emulsion into the curing chamber.

The HIPE may comprise at least one monomer with a boiling point less than about 60° C. Exemplary monomers include chloroprene, isoprene, and butadiene. These volatile monomers are not easily managed with the HIPE curing processes disclosed to date. When these are employed in the current invention, the pressure of the process must be sufficient to prevent undue volatilization of these monomers even with the heating necessary to effect rapid cure. Foams using these monomers appropriately may be biodegradable as disclosed in aforementioned U.S. Pat. No. 5,767,168, in which HIPE foams made with isoprene are prepared at a pressure of about 30 psi (2 atmospheres) and a temperature of 50° C. for 48 hours or more. The process according to the current invention enables the curing time to be shortened significantly by applying higher temperatures and pressures. Foams based on chloroprene may be flame retardant, as disclosed in aforementioned copending application Ser. No. 09/118,613. As taught in each of these references, the inclusion of antioxidants may be especially preferred for HIPE foams made with 1,3-dienes.

III. Test Methods

The test methodologies for measuring Tg, yield stress, expansion factors, and stability in the compressed state are disclosed in U.S. Pat. No. 5,753,359. The methodologies for measuring Resistance to Compression Deflection (RTCD), and Free Absorbent Capacity (FAC) are disclosed in U.S. Pat. No. 5,849,805.

Swelling Ratio: Swelling ratio may be used as a relative measure of the degree of crosslinking of the polymer comprising the HIPE foam. The degree of crosslinking is the critical part of curing as defined herein above. Swelling ratio is determined by cutting a cylindrical sample of the foam 2–6 mm thick, 2.5 cm in diameter. The foam sample is thoroughly washed with water and 2-propanol to remove any residual salts and/or emulsifier. This is be accomplished by placing the sample on a piece of filter paper in a Büchner funnel attached to a filter flask. A vacuum is applied to the filter flask by means of a laboratory aspirator and the sample is thoroughly washed with distilled water and then with 2-propanol such that the water and 2-propanol are drawn through the porous foam by the vacuum. The washed foam sample is then dried in an oven at 65° C. for three hours, removed from the oven, and allowed to cool to room temperature prior to measurement of the swelling ratio. The sample is weighed to within ±1 mg, to obtain the dry weight of the sample, Wd. The sample is then placed in a vacuum flask containing sufficient methanol to completely submerge the foam sample. Remaining air bubbles in the foam structure are removed by gentle reduction of the pressure in the flask by means of a laboratory aspirator. Gentle vacuum is applied and released several times until no more bubbles are observed leaving the foam sample when the vacuum is applied, and the foam sample sinks upon release of the vacuum. The completely saturated foam sample is gently removed from the flask and weighed to within ±1 mg, taking care not to squeeze any of the methanol out of the sample during the weighing process. After the weight of the methanol saturated sample is recorded, (Wm), the sample is again dried by gently expressing most of the methanol followed by oven drying at 65° C. for 1 hour. The dry sample is then placed into a vacuum flask containing sufficient toluene to completely submerge the foam sample. Residual air trapped within the pores of the foam is removed by gentle application and release of vacuum, as described above. The toluene saturated weight of the sample, Wt, is also obtained as described above. The swelling ratio may be calculated from the densities of methanol and toluene, and the weights recorded in the above procedure as follows:

$$\text{Swelling Ratio} = [(Wt - Wd)/(Wm - Wd)] \times 0.912$$

where 0.912 is the ratio of the densities of methanol and toluene.

Yield Stress: Yield stress is the most practical measure of the degree of curing and relates to the compression strength of the HIPE foam. Yield stress is the stress at which a marked change in the slope of the stress-strain curve occurs. This is practically determined by the intersection of extrapolated regions of the stress-strain curve above and below the yield point, as described in more detail below. The general test method for measuring yield stress is disclosed in U.S. Pat. No. 5,753,359. Specifically, for the purposes of this application, the following method is used:

Apparatus: Rheometrics RSA-2 DMA, as is available from Rheometrics Inc., of Piscatawy, N.J.

Setup: 0.1% strain rate per second for 600 seconds (to 60% strain) using 2.5 cm diameter parallel plates in compression mode; 31° C. oven temperature held for 10 minutes prior to the start of the test, and throughout the test.

Sample: HIPE foam samples cut into cylinders 2–6 mm thick and 2.5 cm in diameter The resulting stress-strain curve can be analyzed by line fitting the initial linear elastic and plateau portions of the plot using a linear regression method. The intersection of the two lines thus obtained provides the yield stress (and yield strain).

Density: Foam density can be measured on dry, expanded foams using any reasonable method. The method used herein is disclosed in the aforementioned U.S. Pat. No. 5,387,207.

Curing Rate Determinations: HIPEs are prepared at specified temperatures and placed in suitable containers for specified times at the cure temperatures. The HIPE foams so produced are plunged into an ice bath to quench the curing process. The cooled foams are removed and processed for analysis, usually comprising removal of water by use of pressure, washing in water and/or organic solvent, and drying followed by slicing and/or cutting to the desired dimensions.

V. Specific Examples

These nonlimiting examples illustrate the specific preparation of HIPE foams according the present invention.

Example 1

Batch Preparation of Foam from a HIPE

A) HIPE Preparation

Anhydrous calcium chloride (12.0 g) and potassium persulfate (0.150 g) are dissolved in 300 mL of water. This provides the aqueous phase to be used in forming the HIPE.

To a monomer combination comprising 2-ethylhexylacrylate (EHA) (5.50 g), divinylbenzene (of 42% purity with balance being ethyl styrene) (DVB42) (3.30 g), and 1,6-hexanediol diacrylate (HDDA) (1.20 g) is added a high purity diglycerol monooleate (DGMO) (0.6 g), and ditallowdimethylammonium methyl sulfate (DTDMAMS) (0.1 g). (DVB42 may be obtained from Dow Chemical, Midland, Mich., other monomers may be obtained from Aldrich Chemical Co., Milwaukee, Wis.; DGMO may be obtained from Danisco Ingredients, Brabrand, Denmark; and DTDMAMS may be obtained Witco Corp., Greenwich, Conn.) The diglycerol monooleate emulsifier comprises approximately 81% diglycerol monooleate, 1% other diglycerol monoesters, 3% polyglycerols, and 15% other polyglycerol esters, imparts a minimum oil phase/water phase interfacial tension value of approximately 2.5 dyne/cm and has a critical aggregation concentration of approximately 2.9 wt %. This provides the oil phase to be used in forming the HIPE. The monomer percentages by weight are 55% EHA, 33% DVB42, and 12% HDDA.

A portion of the oil phase (5.00 g) is weighed into a high-density polyethylene cup with vertical sides and a flat bottom. The internal diameter of the cup is 70 mm and the height of the cup is 120 mm. The oil phase is stirred using an overhead stirrer equipped with a stainless steel impeller attached to the bottom of a stainless steel shaft ⅜ inch (9.5 mm) in diameter. The impeller has 6 arms extending radially from a central hub, each arm with a square cross section 3.5 mm×3.5 mm, and a length of 27 mm measured from the shaft to the tip of the arm. The oil phase is stirred with the impeller rotating at 250 to 300 rpm while 240 mL of pre-heated aqueous phase (47° C.) is added drop-wise over a period of ca. 4 minutes to form a thick high internal phase emulsion. The impeller is raised and lowered within the emulsion during the addition of the aqueous phase so as to achieve uniform mixing of the components. After all of the aqueous phase has been added, the emulsion is stirred for an additional minute with an impeller speed of ca. 400 rpm to achieve a thick but pourable, uniform HIPE.

B) Polymerization/Curing of HIPE

A portion of the emulsion is poured into a cylindrical stainless steel vessel (see FIG. 7) with a wall thickness of ca. 3 mm, a depth of ca. 16 mm and an internal diameter of ca. 3.8 cm so as to completely fill the vessel. A 6 mm thick stainless steel lid equipped with an O-ring is used to seal the vessel, the lid being secured by means of a C-clamp. The entire vessel is submerged in a bath of silicone oil pre-heated to the desired curing temperature for the required length of time. Upon removal from the oil bath, the vessel is immediately submerged in bath containing a mixture of ice and water in order to cool the vessel and its contents rapidly. After several minutes, the vessel is removed from the ice/water bath and the cured foam within is removed carefully for washing, dewatering, and characterization, as described in the Test Methods section above.

C) Foam Washing and Dewatering

The cured HIPE foam is removed from the container. The foam at this point has residual water phase (containing dissolved or suspended emulsifiers, electrolyte, initiator residues, and initiator) about 48 times the weight of polymerized monomers. The foam is dewatered by placing the sample on a piece of filter paper in a Büchner funnel attached to a filter flask. A vacuum is applied to the filter flask by means of a laboratory aspirator and the sample is thoroughly washed with distilled water and then with 2-propanol such that the water and 2-propanol are drawn through the porous foam by the vacuum. The washed foam sample is then dried in an oven at 65° C. for three hours, removed from the oven, and allowed to cool to room temperature prior to characterization as described in the Test Methods section above.

Exemplary data are presented in Table 1 below

TABLE 1

| Condition | Container | Curing Temp. (° C.) | Time | Yield Stress (psi) | Solvent swell ratio | Density (mg/cm³) |
|---|---|---|---|---|---|---|
| 1* | HDPE* | 65 | 3 h | 0.9 | 1.26 | 19 |
| 2* | ss chamber | 65 | 16 h | 1.2 | 1.16 | 18 |
| 3 | ss chamber | 101 | 20 min. | 1.7 | 1.18 | 20 |
| 4 | ss chamber | 112 | 10 min. | 1.3 | 1.20 | 18 |
| 5 | ss chamber | 113 | 20 min. | 1.3 | 1.17 | 19 |
| 6 | ss chamber | 124 | 8 min. | 1.3 | 1.15 | 19 |
| 7 | ss chamber | 123 | 10 min. | 1.4 | 1.18 | 19 |
| 8 | ss chamber | 131 | 6 min. | 1.1 | 1.17 | 19 |
| 9 | ss chamber | 182 | 4 min. | 1.3 | 1.20 | 26 |

*Comparative Conditions 1 and 2 demonstrate curing at ambient pressure according to the prior art.

Long cure times (typically>8 hours) are required to achieve full cure at 65° C., as evidenced by the yield stress data. At 65° C., no foam is recoverable at cure times less than about 2.5 hours, i.e. a minimum of about 2.5 hours is required for the HIPE to cure sufficiently so as to have enough mechanical integrity to be recovered.

Example 2

Continuous Preparation of Foam from a HIPE

A) HIPE Preparation

Anhydrous calcium chloride (36.32 kg) and potassium persulfate (189 g) are dissolved in 378 L of water. This provides the water phase stream to be used in a continuous process for forming the HIPE.

To a monomer combination comprising DVB42 (2100 g), 2-EHA (3300 g), and HDDA (600 g) is added a very high purity DGMO (360 g), and Tinuvin 765 (30 g). After mixing, this emulsifier mixture is allowed to settle overnight. No visible residue is formed and all of the mix is withdrawn and used in the oil phase as the emulsifier in forming the HIPE.

Separate streams of the oil phase (25° C.) and water phase (65° C.) are fed to a dynamic mixing apparatus as in Example 1 of U.S. Pat. No. 5,827,909. A portion of the material exiting the dynamic mixing apparatus is withdrawn and recirculated by a recirculation loop as shown and described in the Figure of the aforementioned U.S. Pat. No. 5,827,909 to the entry point of the oil and water phase flow streams to the dynamic mixing zone.

The combined mixing and recirculation apparatus is filled with oil phase and water phase at a ratio of 4 parts water to 1 part oil. The dynamic mixing apparatus is vented to allow air to escape while filling the apparatus completely. The flow rates during filling are 3.78 g/sec oil phase and 15.12 cc/sec water phase with about 15 cc/sec in the recirculation loop. During the start-up phase, the HIPE produced is diverted into a holding tank until production conditions are achieved.

Once the apparatus set-up is filled, the water phase flow rate is cut in half to reduce the pressure build up while the vent is closed. Agitation is then begun in the dynamic mixer, with the impeller turning at 1800 RPM. The flow rate of the water phase is then steadily increased to a rate of 45.4 cc/sec over a time period of about 1 min., and the oil phase flow rate is reduced to 0.757 g/sec over a time period of about 2 min. The recirculation rate is steadily increased to about 45 cc/sec during the latter time period. The back pressure created by the dynamic and static mixers at this point is about 10 PSI (69 kPa). The Waukesha pump speed is then steadily decreased to yield a recirculation rate of about 11 cc/sec.

B) Polymerization/Curing of HIPE

Once steady-state production of HIPE is achieved, a portion of the emulsion flowing from the static mixer is pumped into the bottom of a vertical stainless steel chamber with a rectangular cross-section having internal dimensions of 5 mm×300 mm, and a length (height) of 15 meters. A section near the bottom of the tube is jacketed and oil at 140° C. is continuously pumped through the jacket. The emulsion is pumped through the chamber at a rate such that the residence time in the heated section is 10 minutes. During this 10 minute period, the oil phase is polymerized/cured to form an open celled foam.

C) Foam Washing and Dewatering

The cured HIPE foam exits from the top of the chamber in the form of a continuous sheet with the same cross-section as that of the curing chamber (300 mm wide, 5 mm thick). The foam at this point has residual aqueous phase (containing dissolved or suspended emulsifiers, electrolyte, initiator residues, and initiator) about 50–60 times (50–60×) the weight of polymerized monomers. The foam sheet is then subjected to compression in a series of 2 porous nip rolls equipped with vacuum which gradually reduce the residual water phase content of the foam to about 6 times (6×) the weight of the polymerized material. At this point, the sheet is then resaturated with a 1.5% $CaCl_2$ solution at 60° C., and squeezed in a series of 3 porous nip rolls equipped with vacuum to a water phase content of about 4×. The $CaCl_2$ content of the foam is between 8 and 10%.

The foam remains compressed after the final nip at a thickness of about 0.021 in. (0.053 cm). The foam is then dried in air for about 16 hours. Such drying reduces the moisture content to about 9–17% by weight of polymerized material. At this point, the foam sheets are very drapeable. The foam also contains about 5% by weight of residual diglycerol monooleate emulsifier. In the collapsed state, the density of the foam is about 0.14 g/cc. When expanded in water, its free absorbent capacity is about 60 mL/g and has a glass transition temperature of about 23° C.

Example 3

Alternate Formulations

The process of Example 2 is replicated with different monomer types and ratios and other conditions as shown in Table 2 below:

TABLE 2

| Cond'n No. | EHA | DVB 42 | STY | HDDA | ISO | CPR* | W:O Ratio | Pour T ° C. | Mixer RPM | Cure Temp. ° C. | Cure Time min. |
|---|---|---|---|---|---|---|---|---|---|---|---|
| 1 | 45% | 33% | 22% | 0% | 0% | 0% | 50:1 | 65° | 700 | 135° | 12 |
| 2 | 0% | 0% | 0% | 35% | 65% | 0% | 45:1 | 10° | 700 | 135° | 20 |
| 3 | 58% | 42% | 0% | 0% | 0% | 0% | 50:1 | 65° | 250 | 135° | 12 |
| 4 | 58% | 20% | 22% | 0% | 0% | 0% | 20:1 | 65° | 400 | 135° | 12 |
| 5 | 58% | 12% | 30% | 0% | 0% | 0% | 15:1 | 65° | 400 | 135° | 12 |
| 6 | 0% | 15% | 45% | 0% | 0% | 40%* | 35:1 | 65°* | 1200 | 135° | 20 |

*EHA = 2-ethylhexyl acrylate;
DVB42 = divinyl benzene of 42% purity;
STY = styrene;
HDDA = 1,6-hexanediol diacrylate;
ISO = isoprene;
CPR = chloroprene, used in ID # 6 only, wherein the emulsification is carried out under a pressure of 7 atmospheres.

The foams produced in these examples are open-celled and sufficiently cured in the time noted to have useful properties. Each can be post-treated to be either hydrophilic or hydrophobic, depending on the intended use. Foam number 1, for example, may be used as a packaging or insulating foam, among other uses. Foam 2 is biodegradable. Foam 3 may be used as a material for acquiring urine rapidly, for example. Foams 4 and 5 may be used in applications like floor mats where a high degree of toughness and abrasion resistance is required. Foam 6 is an example of a foam which does not burn on exposure to open flame. (An optional adjuvant in Foam 6 is, for example, antimony trioxide microparticles added to the oil phase prior to emulsification.) Each of these uses is exemplary but non-limiting. The formulations may be altered in each parameter to modify the properties such as Tg (add more Tg lowering monomer), cell size (decrease by increasing shear or RPM), density (decrease by increasing W:O ratio), toughness (increase by adding styrene), and the like.

The disclosures of all patents, patent applications (and any patents which issue thereon, as well as any corresponding published foreign patent applications), and publications mentioned throughout this description are hereby incorporated by reference herein. It is expressly not admitted, however, that any of the documents incorporated by reference herein teach or disclose the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of continuously curing a HIPE into a HIPE foam, the method comprising the steps of:
   A) continuously providing a HIPE, said HIPE comprising:
   1) an oil phase comprising:
      a) from about 85 to about 99% by weight of a monomer component capable of forming a copolymer having a Tg value of below about 90° C. or lower, the monomer component comprising:
         i) from about 5 to about 80% by weight of a substantially water-insoluble, monofunctional monomer capable of forming a polymer having a Tg of about 35° C. or less;
         ii) from about 0 to about 70% by weight of a substantially water-insoluble, monofunctional comonomer capable of imparting other desired properties to the foam;
         iii) about 5 to about 80% by weight of at least one substantially water-insoluble, polyfunctional crosslinking agent; and
      b) from about 1 to about 20% by weight of an emulsifier component which is soluble in the oil phase and which is suitable for forming a stable water-in-oil emulsion; and 2) a water phase comprising an aqueous solution containing: (a) from about 0.2 to about 40% by weight of a water-soluble electrolyte; and (b) an effective amount of a polymerization initiator;

wherein the emulsion has a volume to weight ratio of water phase to oil phase in the range of from about 8:1 to about 140:1;

B) transferring said HIPE into a curing chamber, wherein said curing chamber is provided with means to maintain said HIPE at a curing temperature, suitable for polymerizing and crosslinking said monomer, comonomer, and crosslinking agent;

C) maintaining said HIPE in said curing chamber for a residence time sufficient for at least partial curing of said HIPE into a nascent HIPE foam;

D) characterized in that said nascent HIPE foam is continuously withdrawn from said curing chamber; and E) further processing said nascent HIPE foam into a cured HIPE foam.

2. The process of claim 1 wherein:

1) the oil phase comprises:

a) from about 90 to about 97% by weight of a monomer component capable of forming a copolymer having a Tg value from about 15° to about 50° C., the monomer component comprising:

i) from about 40 to about 70% by weight monomer selected from the group consisting of $C_4$–$C_{14}$ alkyl acrylates, aryl acrylates, $C_6$–$C_{16}$ alkyl methacrylates, dienes, $C_4$–$C_{12}$ alkyl styrenes and mixtures thereof;

ii) from about 15 to about 23% by weight comonomer selected from the group consisting of styrene, ethyl styrene and mixtures thereof;

iii) from about 5 to about 18% by weight divinyl benzene; and b) from about 3 to about 10% by weight of the emulsifier component; and 2) the water phase comprises from about 1 to about 40% calcium chloride.

3. A method according to claim 2 wherein said curing chamber has a cross section selected from the group consisting of rectangular, circular, triangular, annular, oval, hourglass, dog bone, and asymmetric.

4. A method according to claim 3 wherein said curing chamber has a rectangular cross section.

5. A method according to claim 4 wherein said rectangular curing chamber has a large width:thickness aspect ratio so as to form said HIPE into a HIPE foam having a sheet form.

6. A method according to any of the above claims wherein said curing chamber comprises an apparatus that constrains said HIPE between a curing drum and a confining web.

7. A method according to claim 1 wherein said curing temperature is greater that about 65°.

* * * * *